(12) United States Patent
Herik Van Den

(10) Patent No.: US 10,806,955 B2
(45) Date of Patent: Oct. 20, 2020

(54) FALL ARRESTOR TO GRADUALLY ABSORB A PULL ON A SAFETY CABLE COUPLED WITH THE FALL ARRESTOR

(71) Applicant: XSPlatforms B.V., Gorinchem (NL)

(72) Inventor: Peter Herik Van Den, Sliedrecht (NL)

(73) Assignee: XSPlatforms B.V., Gorinchem (NL)

(*) Notice: Subject to any disclaimer, the term of this patent is extended or adjusted under 35 U.S.C. 154(b) by 0 days.

(21) Appl. No.: 16/065,888

(22) PCT Filed: Dec. 19, 2016

(86) PCT No.: PCT/NL2016/050890
§ 371 (c)(1),
(2) Date: Jun. 25, 2018

(87) PCT Pub. No.: WO2017/111579
PCT Pub. Date: Jun. 29, 2017

(65) Prior Publication Data
US 2018/0369622 A1    Dec. 27, 2018

(30) Foreign Application Priority Data

Dec. 23, 2015  (NL) ...................................... 2016016

(51) Int. Cl.
*A62B 35/00* (2006.01)
*A62B 35/04* (2006.01)
*F16F 7/12* (2006.01)

(52) U.S. Cl.
CPC .......... *A62B 35/0068* (2013.01); *A62B 35/04* (2013.01); *F16F 7/12* (2013.01)

(58) Field of Classification Search
CPC .......... A62B 35/00068; A62B 35/0037; A62B 35/0075; A62B 35/0062; A62B 35/04; F16F 7/12; E06C 7/186; E06C 7/482
See application file for complete search history.

(56) References Cited

U.S. PATENT DOCUMENTS

| | | | | |
|---|---|---|---|---|
| 2,701,629 A | * | 2/1955 | Cairnes | F16F 7/08 188/129 |
| 3,598,200 A | * | 8/1971 | Thompson | E06C 7/186 182/8 |
| 2019/0169934 A1 | * | 6/2019 | Adams | A62B 35/0037 |

FOREIGN PATENT DOCUMENTS

| | | | | |
|---|---|---|---|---|
| CA | 2181858 A1 | * | 1/1998 | E06C 7/186 |
| DE | 4312 343 A1 | | 10/1994 | |

(Continued)

OTHER PUBLICATIONS

European Patent Officel NL; May 31, 2017.

*Primary Examiner* — Katherine W Mitchell
*Assistant Examiner* — Candace L Bradford
(74) *Attorney, Agent, or Firm* — Patshegen IP LLC; Moshe Pinchas

(57) ABSTRACT

A fall shock absorber comprises a frame 5 formed by an elongated profile that has a U-shaped cross section. The frame comprises two parallel strips 11 which are attached to each other by a bridge 13. The strips accommodate tapered slots 15 through which a shaft 17 is projected. A bracket 19 to which a safety cable 21 is fixed is present on the shaft. The width of the slot at the wider end 15A is equal to the thickness of the shaft 17 and the width of the slot at the narrower end 15B is smaller than the thickness of the shaft. The material of the shaft 17 is softer than the material of the strips 11, so that when the shaft is displaced through the slots the shaft shows plastic deformation.

12 Claims, 3 Drawing Sheets

(56) References Cited

FOREIGN PATENT DOCUMENTS

| | | | |
|---|---|---|---|
| DE | 10 2011 015140 A1 | 9/2012 | |
| EP | 2 826 947 A1 | 1/2015 | |
| EP | 2826947 B1 * | 5/2016 | ......... A62B 35/0068 |
| WO | 95/08467 A1 | 3/1995 | |

* cited by examiner

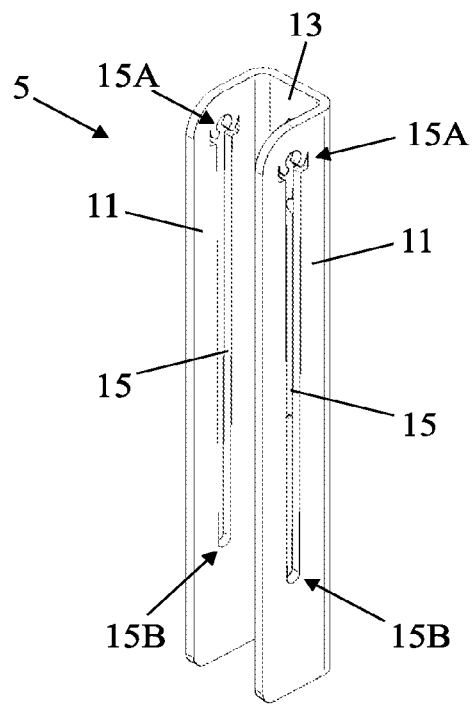
FIG. 7
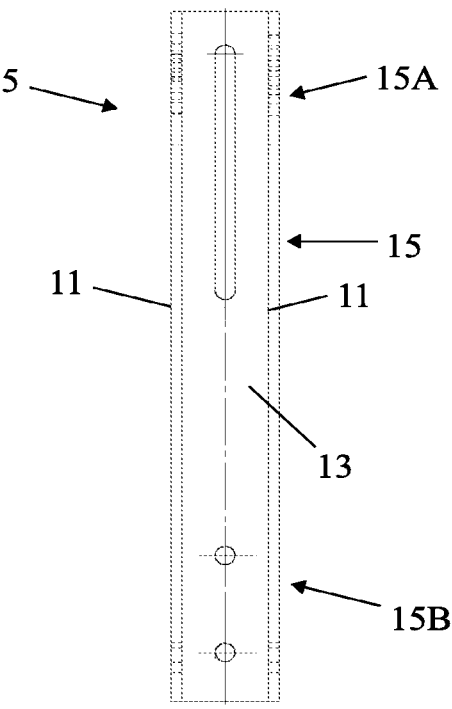
FIG. 8
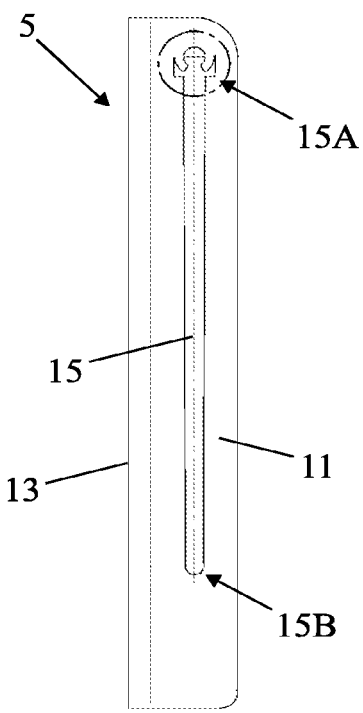
FIG. 9
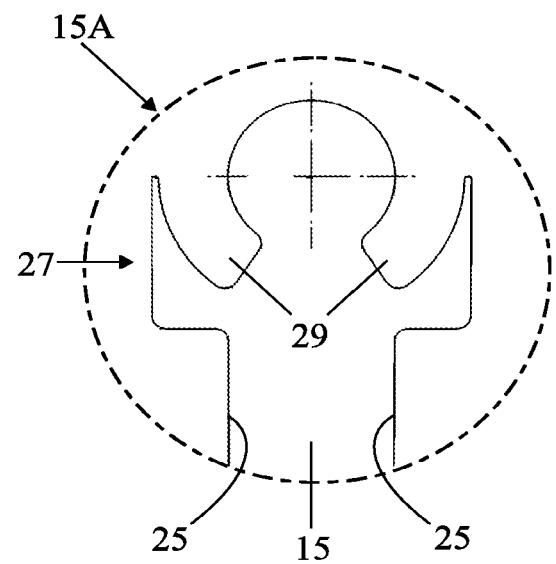
FIG. 10
FIG. 11

FALL ARRESTOR TO GRADUALLY ABSORB A PULL ON A SAFETY CABLE COUPLED WITH THE FALL ARRESTOR

FIELD OF THE INVENTION

The invention relates to a fall shock absorber for gradually receiving a pull at a safety cable coupled to the fall shock absorber, the fall shock absorber comprising a frame by which the fall shock absorber may be attached to an object, as well as a frame-connected coupling element to which the safety cable can be fixed, where the frame is provided with a slot through which the coupling element is inserted.

An object may be understood to be for example a building, electricity pylon, wind mill etc. or a ladder (coupled to a building), a fall shock absorber system slidable along a descending cable.

STATE OF THE ART

A fall shock absorber of this type is known from U.S. Pat. No. 2,701,629A. Here the frame comprises a plurality of parallel strips and the coupling element is formed by a plurality of shafts inserted through the slots present in the strips. The shafts carry rings which are in contact with the outermost strips and are squeezed against the strips by means of springs. A pull at the safety cable is then received by the friction between the rings and the strips.

SUMMARY OF THE INVENTION

It is an object of the invention to provide a fall shock absorber of the type defined in the opening paragraph which is simple, robust and reliable and with which larger pulls than with the known fall shock absorber can be received. For this purpose the fall shock absorber according to the invention is characterized in that the slot is a tapered slot where the width of the slot at the wider end equals or exceeds the thickness of the part of the coupling element that is projected through the slot and the width of the slot at the narrower end is smaller than the thickness of the part of the coupling element, and where the hardness of the material of said part of the coupling element deviates from the hardness of the material of the bounding walls of the slot. With a pull at the safety cable this construction absorbs a large part of the kinetic energy of the falling mass. As a result, the frame's impulse/impact force on terra firma is reduced considerably.

The material of said part of the coupling element is preferably softer than the hardness of the material of the bounding walls of the slot, so that mainly the part of the coupling element is deformed and not the frame.

The frame comprises at least a strip in which the slot is accommodated. The frame preferably comprises two parallel strips spaced apart from each other while a slot is present in either one of the two strips. The strips preferably form part of an elongated profile that has a U-shaped cross section. This profile forms part of or is the frame which is thus embodied in a robust manner.

Said part of the coupling element is preferably formed by a shaft having a round section. The shaft is preferably embodied as a bolt.

An advantageous embodiment of the fall shock absorber according to the invention is characterized in that at least one of the tapered bounding walls of the slot at the wider end of the slot is provided with at least one inwardly projecting flexible lip, as a result of which said part of the coupling element is enclosed by the wider end of the slot and this lip. As a result, the coupling element will not be displaced until a pull is given with a certain force and not with any light pull. These light pulls would otherwise take up part of the energy absorbing power as a result of which less energy could be absorbed in the event of a fall.

The wider end of the slot is preferably widened so that the lip when bent away can be bent in the widened part and does not block the slot. Furthermore, also the other bounding wall of the slot is preferably provided with a lip.

A further embodiment of the fall shock absorber according to the invention is characterized in that the coupling element further includes a bracket which is pivotable around the shaft and to which the safety cable can be fixed. The bracket is preferably a U-shaped rod that on both sides is provided with through holes the shaft is projected through.

BRIEF DESCRIPTION OF THE DRAWINGS

The invention will be further explained below while reference is made to an example of embodiment of the fall shock absorber according to the invention shown in the appended drawings, in which:

FIG. 7 shows a perspective view of the frame of the fall shock absorber;

FIG. 8 shows a front view of the frame;

FIG. 9 shows a side view of the frame;

FIG. 10 shows a plan view of the frame; and

FIG. 11 shows a detailed view of the widened end of the slot.

DETAILED DESCRIPTION OF THE DRAWINGS

Figure 1:
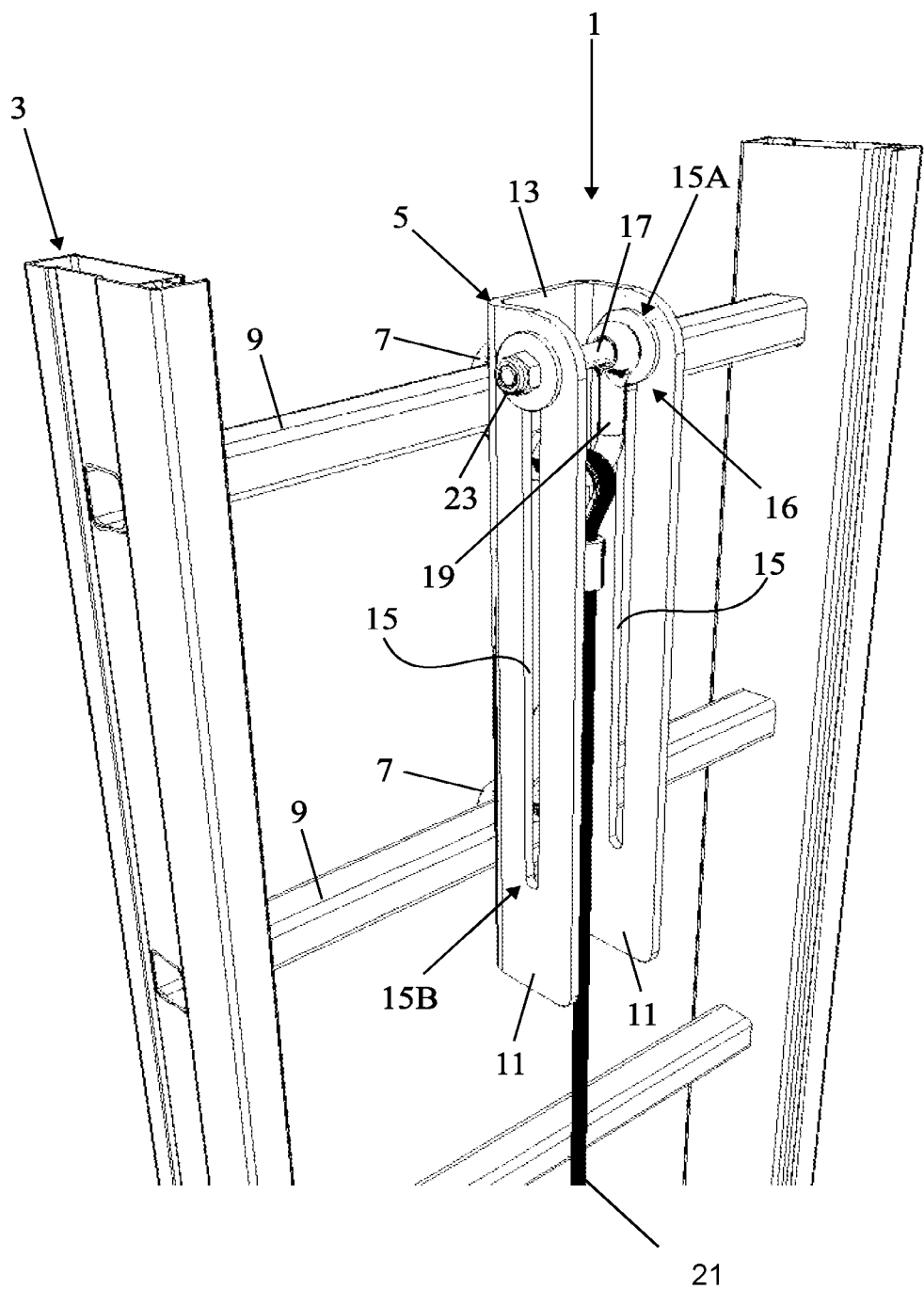
FIG. 1 shows an embodiment of the fall shock absorber fixed to a ladder which is attached to an object.
Figure 2:
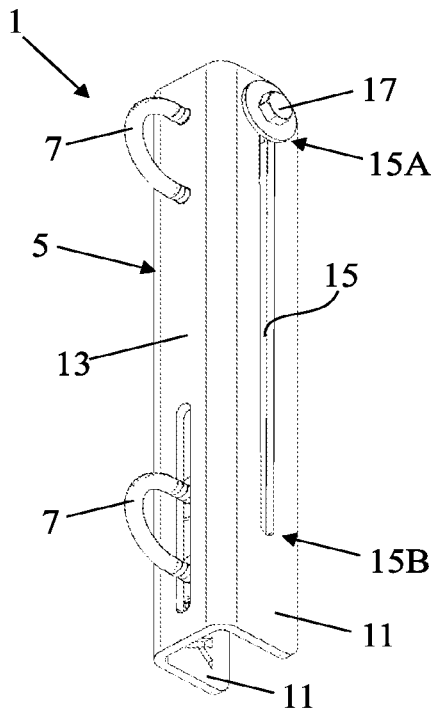
FIG. 2 shows a perspective view of the fall shock absorber.
Figure 3:
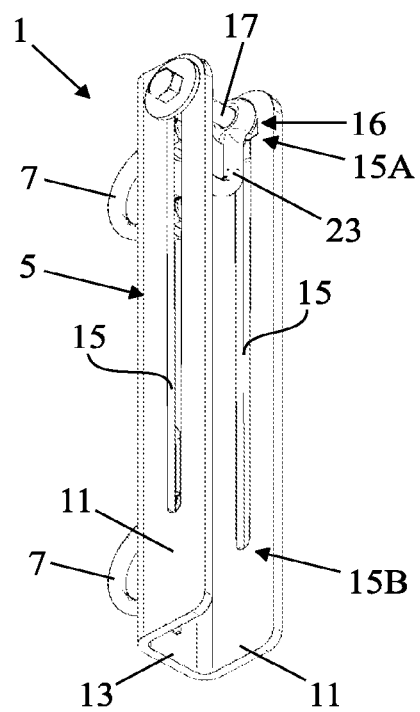
FIG. 3 shows the fall shock absorber viewed from another angle.
Figure 4:
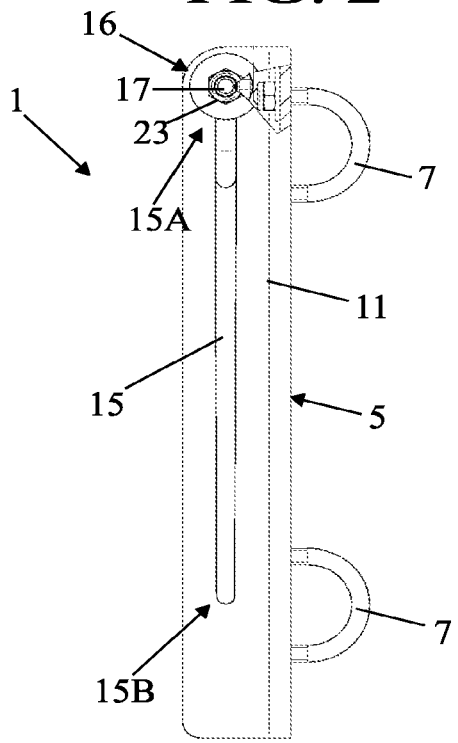
FIG. 4 shows a side view of the fall shock absorber.
Figures 5, 6:
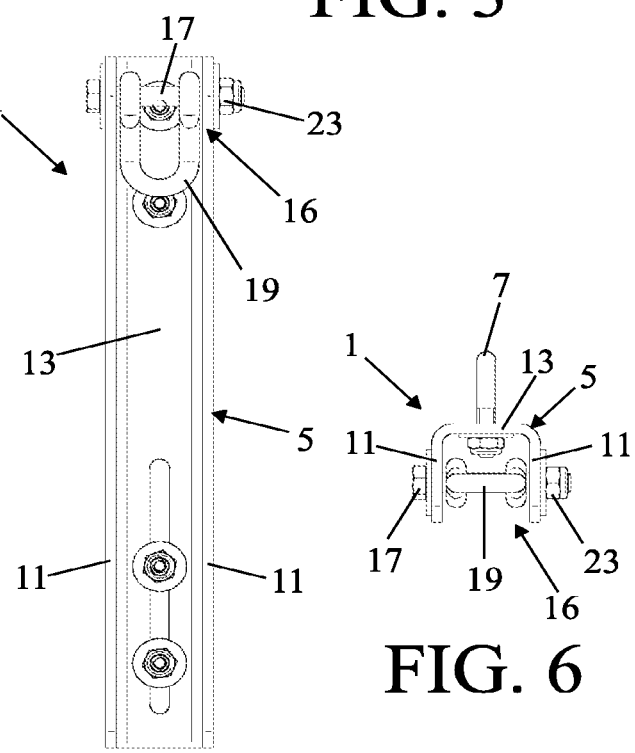
FIG. 5 shows a front view of the fall shock absorber.
FIG. 6 shows a bottom view of the fall shock absorber.

FIG. 1 shows an embodiment of the fall shock absorber 1 fixed to a ladder 3 which is attached to an object, for example a building (not shown). The fall shock absorber comprises a frame 5 formed by an elongated profile having a U-shaped cross section. The frame is mounted by means of U-shaped threaded ends 7 to rungs 9 of the ladder. The frame comprises two parallel strips 11 which are attached to each other by means of a bridge 13. The strips have slots 15 through which a shaft 17 is inserted. A bracket 19 is pivotally present on the shaft. The bracket 19 is formed by a U-shaped rod whose two ends are provided with through holes accommodating the shaft. A safety cable 21 is attached to this bracket. The shaft 17 is formed by a bolt on which a nut 23 is screwed. The shaft forms part of a coupling element 16 for fixing the safety cable to the fall shock absorber.

In FIGS. 2 to 6 the fall shock absorber 1 is shown by way of illustration in different views. The slots 15 in the strips 11 are tapering. The width of the slot at the wider end 15A is equal to the thickness of the shaft 17, and the width of the slot at the narrower end 15B is smaller than the thickness of the shaft. The material of the shaft 17 is softer than the material of the strips 11, so that when the shaft is displaced through the slots only the shaft or substantially only the shaft shows plastic deformation.

In FIGS. 7 to 10 the frame of the fall shock absorber is shown in different views. By way of illustration FIG. 11 shows an enlarged view of the wider end of a slot. The slots 15 are widened at the wider end 15A. Each bounding wall 25 of the slots is provided with an inwardly projecting lip 29 at the location of the widened part 27. The shaft 17 is enclosed by the wider end 15A of the slot and the lips 29.

Although the invention has been described in the foregoing based on the drawings, it should be observed that the invention is not by any manner or means restricted to the embodiment shown in the drawings. The invention also extends to all embodiments deviating from the embodiment shown in the drawings within the scope defined by the claims. For example in lieu of the fall shock absorber being attached in vertical orientation, it may also be attached in horizontal orientation to terra firma, for example on a roof of a building. Alternatively, the material of said part of the coupling element 16 may be harder than the material of the bounding walls 25 of the slot 15, so that in essence these bounding walls show deformation and the coupling element does not.

The invention claimed is:

1. A fall shock absorber for gradually receiving a pull at a safety cable coupled to the fall shock absorber, the fall shock absorber comprising a frame by which the fall shock absorber is attached to an object coupled to a building, as well as a coupling element which is connected to the frame and to which the safety cable can be fixed, where the frame is provided with a slot through which a part of the coupling element is inserted, which part of the coupling element has a thickness and a hardness, wherein the slot is provided with two bounding walls having a hardness and wherein the slot is tapered and has a first end and a second end of which the first end has a width larger than a width of the second end, where the width of the first end of the slot equals or exceeds the thickness of the part of the coupling element projecting through the slot and the width of the second end of the slot is smaller than the thickness of the part of the coupling element projecting through the slot, and where the hardness of said part of the coupling element projecting through the slot is different than the hardness of the bounding walls of the slot.

2. The fall shock absorber as claimed in claim 1, wherein the hardness of said part of the coupling element projecting through the slot is smaller than the hardness of the bounding walls of the slot.

3. The fall shock absorber as claimed in claim 1, wherein the frame comprises at least a strip in which the slot is accommodated.

4. The fall shock absorber as claimed in claim 1, wherein the frame comprises two parallel strips spaced apart from each other while a slot is present in either one of the two strips.

5. The fall shock absorber as claimed in claim 4, wherein the strips form part of an elongated profile that has a U-shaped cross section.

6. The fall shock absorber as claimed in claim 1, wherein said part of the coupling element is formed by a shaft having a round section.

7. The fall shock absorber as claimed in claim 6, wherein the shaft is embodied as a bolt.

8. The fall shock absorber as claimed in claim 6, wherein at least one of the two bounding walls of the slot at the first end of the slot is provided with at least one inwardly projecting flexible first lip, as a result of which said part of the coupling element is enclosed by the first end of the slot and said first lip.

9. The fall shock absorber as claimed in claim 8, wherein the width of the first end of the slot is such that the first lip when bent in the first end of the slot does not block the slot.

10. The fall shock absorber as claimed in claim 8, wherein said two bounding walls include a first bounding wall having said first lip and a second bounding wall having a second lip.

11. The fall shock absorber as claimed in claim 6, wherein the coupling element further includes a bracket which is pivotable around the shaft and to which the safety cable can be fixed.

12. The fall shock absorber as claimed in claim 11, wherein the bracket is a U-shaped rod having two ends that are provided with through holes configured for accommodating the shaft.

* * * * *